(12) United States Patent
Roy

(10) Patent No.: US 9,039,036 B1
(45) Date of Patent: May 26, 2015

(54) FOAM-IN-PLACE INTERIOR PANELS HAVING INTEGRATED AIRBAG DOORS INCLUDING MULTI-SHOT INJECTION MOLDED AIRBAG CHUTE-DOOR ASSEMBLIES FOR MOTOR VEHICLES AND METHODS FOR MAKING THE SAME

(71) Applicant: Faurecia Interior Systems, Inc., Auburn Hills, MI (US)

(72) Inventor: Wes Roy, Oakland, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 11 days.

(21) Appl. No.: 14/134,031

(22) Filed: Dec. 19, 2013

(51) Int. Cl.
| | |
|---|---|
| *B60R 21/215* | (2011.01) |
| *B29C 44/56* | (2006.01) |
| *B29K 101/00* | (2006.01) |
| *B29L 31/00* | (2006.01) |
| *B29L 31/58* | (2006.01) |
| *B29L 9/00* | (2006.01) |

(52) U.S. Cl.
CPC ........... *B60R 21/215* (2013.01); *B29C 44/5681* (2013.01); *B29K 2101/00* (2013.01); *B29L 2031/768* (2013.01); *B29L 2031/58* (2013.01); *B29L 2009/00* (2013.01)

(58) Field of Classification Search
CPC .......................... B60R 21/215; B29C 44/5681
See application file for complete search history.

(56) References Cited

U.S. PATENT DOCUMENTS

| | | | |
|---|---|---|---|
| 5,845,931 A | 12/1998 | Nagy et al. | |
| 6,092,835 A | 7/2000 | Thakore et al. | |
| 6,164,686 A * | 12/2000 | Rupp | 280/728.3 |
| 6,237,935 B1 | 5/2001 | Gray et al. | |
| 6,457,739 B1 | 10/2002 | Dailey et al. | |
| 6,623,029 B2 | 9/2003 | Sun et al. | |
| 6,735,878 B2 | 5/2004 | Lie | |
| 7,237,797 B2 | 7/2007 | Dailey et al. | |
| 7,914,039 B2 | 3/2011 | Mazzocchi et al. | |
| 8,336,906 B2 | 12/2012 | Kim et al. | |
| 8,469,393 B1 * | 6/2013 | Siewert et al. | 280/728.3 |
| 8,870,219 B1 * | 10/2014 | Roy et al. | 280/728.3 |
| 2006/0214399 A1 | 9/2006 | Okamoto et al. | |
| 2015/0035261 A1 * | 2/2015 | Roy et al. | 280/728.3 |

FOREIGN PATENT DOCUMENTS

| | | |
|---|---|---|
| DE | 19948021 A1 | 4/2001 |
| DE | 102005055934 A1 | 5/2007 |
| JP | 2008149810 A | 7/2008 |

\* cited by examiner

*Primary Examiner* — Faye M Fleming
(74) *Attorney, Agent, or Firm* — Ingrassia Fisher & Lorenz P.C.

(57) ABSTRACT

Interior panels having integrated airbag doors for motor vehicles and methods for making such interior panels are provided herein. In one example, an interior panel comprises a substrate having outer and inner surfaces and an opening extending therethrough. A multi-shot injection molded airbag chute-door assembly is mounted to the substrate and comprises a chute wall that at least partially surrounds an interior space. A door flap portion is pivotally connected to the chute wall and at least partially covers the opening. A perimeter flange extends from the chute wall and has a flange section that overlies the outer surface of the substrate. A molded-in lip feature extends from the flange section and contacts the outer surface to form a seal between the flange section and the substrate. A skin covering extends over the substrate and a foam is disposed between the skin covering and the substrate.

14 Claims, 4 Drawing Sheets

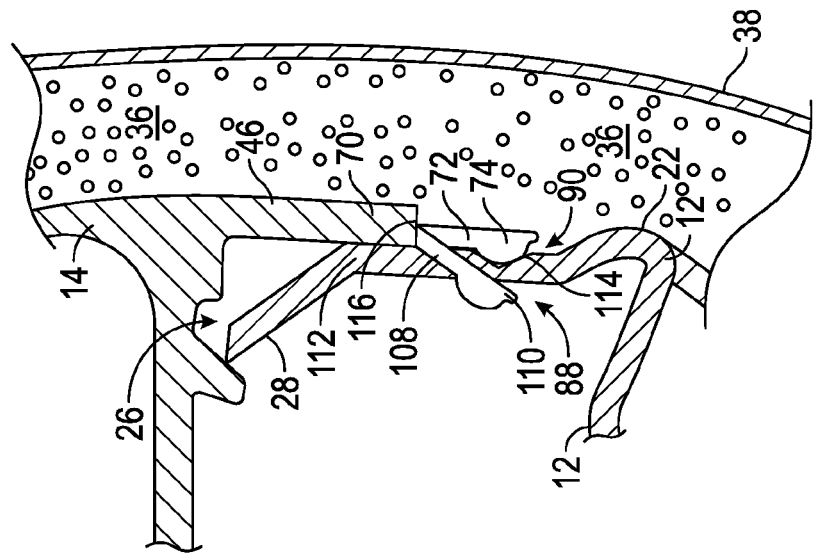
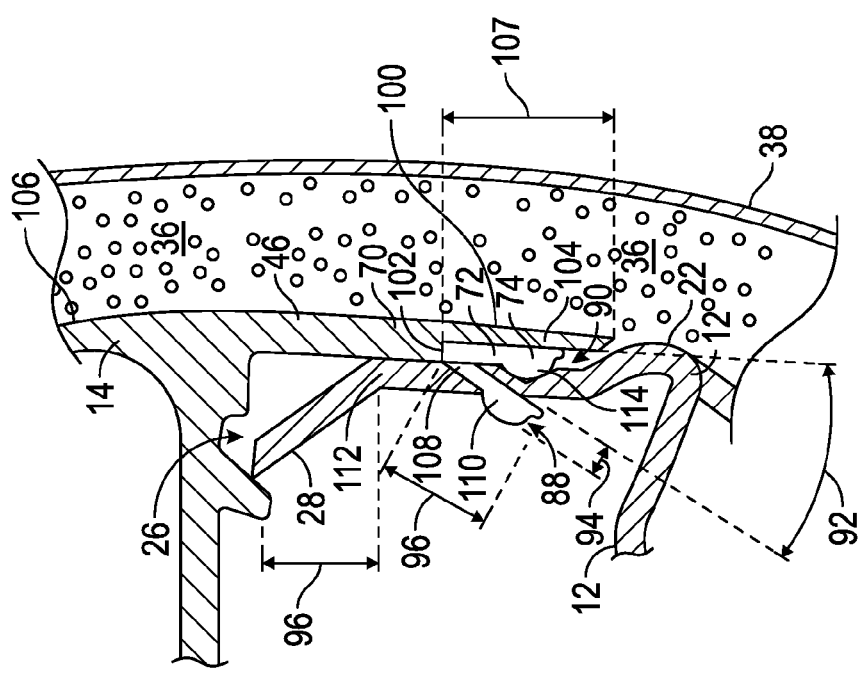
FIG. 3A
FIG. 3B

FOAM-IN-PLACE INTERIOR PANELS HAVING INTEGRATED AIRBAG DOORS INCLUDING MULTI-SHOT INJECTION MOLDED AIRBAG CHUTE-DOOR ASSEMBLIES FOR MOTOR VEHICLES AND METHODS FOR MAKING THE SAME

TECHNICAL FIELD

The technical field relates generally to interior panels structured for inflatable restraints for motor vehicles, and more particularly to foam-in-place interior panels having integrated airbag doors for motor vehicles and methods for making such interior panels.

BACKGROUND

Motor vehicles often include an inflatable restraint apparatus having an airbag device with a deployable airbag positioned in or behind an interior vehicle panel, such as an instrument panel, door panel, seats, and the like. Many interior panels include an integrated airbag door formed into the interior panel that is designed to break free upon deployment of the airbag. Often an area of the interior panel surrounding the integrated airbag door is scored or pre-weakened to form a seam that facilitates a clean airbag deployment e.g., airbag deployment with minimal or no fragmentation.

Foam-in-place (FIP) interior panels are often used to provide a padded finish to desired areas of the interiors of motor vehicles. FIP interior panels include a substrate and a skin covering with a foam layer formed between the skin covering and the substrate to provide padding for a softer finish. During fabrication, the foam layer is typically formed by injecting a liquid, e.g., polyurethane precursors such as diisocyanates and polyols, or other foam forming material(s), between the substrate and the skin covering. In FIP interior panels that include an airbag device, an opening is typically defined in the substrate to accommodate the airbag device. During foaming, there is a possibility that the liquid foam forming material that is injected between the skin and the substrate may seep into the opening in the substrate that is for accommodating the airbag device. As a result, foam may be formed into areas that interface with the airbag device during airbag deployment, which would be undesirable. Consequently, there is a need to form a seal to prevent liquid foam forming material from entering the opening and leaking into areas that interface with the airbag device to minimize fragmentation during airbag deployment.

In one example disclosed in U.S. Pat. No. 7,237,797, issued to Dailey et al., a modular airbag door assembly that includes an airbag chute is mounted to a substrate of a FIP instrument panel. The modular airbag door assembly covers an opening formed through the substrate and an airbag device is attached to the airbag chute. The FIP instrument panel includes a manually applied gasket that is sandwiched between a flange of the airbag chute and the outer surface of the substrate surrounding the opening. The gasket provides a seal between the airbag chute and the outer surface of the substrate to prevent liquid foam forming material from leaking into areas that interface with the airbag device. Unfortunately, the manually applied gasket is not always properly positioned or is missing altogether, which results in leakage of the liquid foam forming material into and/or around the airbag device. Additionally, the piece cost of the gaskets and the expense of applying the gaskets can be relatively expensive.

Accordingly, it is desirable to provide FIP interior panels having integrated airbag doors for motor vehicles with consistent sealing to prevent liquid foam forming material from leaking into areas that interface with an airbag device, and methods for making such interior panels. Additionally, it is desirable to provide FIP interior panels having integrated airbag doors for motor vehicles with relatively low cost sealing, and methods for making such interior panels. Furthermore, other desirable features and characteristics of the present invention will become apparent from the subsequent detailed description and the appended claims, taken in conjunction with the accompanying drawings and this background.

BRIEF SUMMARY

Interior panels having integrated airbag doors for motor vehicles and methods for making such interior panels are provided herein. In accordance with an exemplary embodiment, an interior panel having an integrated airbag door for a motor vehicle includes, but is not limited to, a substrate. The substrate has an outer surface, an inner surface, and an opening extending therethrough. A multi-shot injection molded airbag chute-door assembly is mounted to the substrate. The multi-shot injection molded airbag chute-door assembly comprises a chute wall at least partially surrounding an interior space. The chute wall is configured to direct passage of an airbag through the interior space towards the opening during deployment of the airbag. A door flap portion is pivotally connected to the chute wall and at least partially covers the opening. A perimeter flange extends from the chute wall away from the interior space. The perimeter flange has a flange section overlying the outer surface of the substrate. The chute wall, the door flap portion and the perimeter flange comprise a first polymeric material. A molded-in lip feature extends from the flange section and contacts the outer surface to form a seal between the flange section and the substrate. The molded-in lip feature comprises a second polymeric material. A skin covering extends over the substrate and a foam is disposed between the skin covering and the substrate.

In accordance with another exemplary embodiment, a method of making an interior panel having an integrated airbag door for a motor vehicle is provided. The method comprises the steps of mounting a multi-shot injection molded airbag chute-door assembly to a substrate such that the multi-shot injection molded airbag chute-door assembly at least partially covers an opening in the substrate and that a molded-in lip feature extends from a flange section of a perimeter flange of the multi-shot injection molded airbag chute-door assembly contacts an outer surface of the substrate forming a seal between the multi-shot injection molded airbag chute-door assembly and the substrate. The perimeter flange comprises a first polymeric material and the molded-in lip feature comprises a second polymeric material. A skin covering is positioned extending over the outer surface of the substrate. A liquid foam forming material is dispensed between the skin covering and the substrate and the liquid foam forming material is allowed to form a foam.

BRIEF DESCRIPTION OF THE DRAWINGS

The various embodiments will hereinafter be described in conjunction with the following drawing figures, wherein like numerals denote like elements, and wherein:

FIG. 3a is an enlarged view of a portion of the FIP interior panel depicted in FIG. 1 in accordance with one exemplary embodiment;

FIG. 3b is an enlarged view of a portion of the FIP interior panel depicted in FIG. 1 in accordance with another exemplary embodiment.

DETAILED DESCRIPTION

Figure 1:
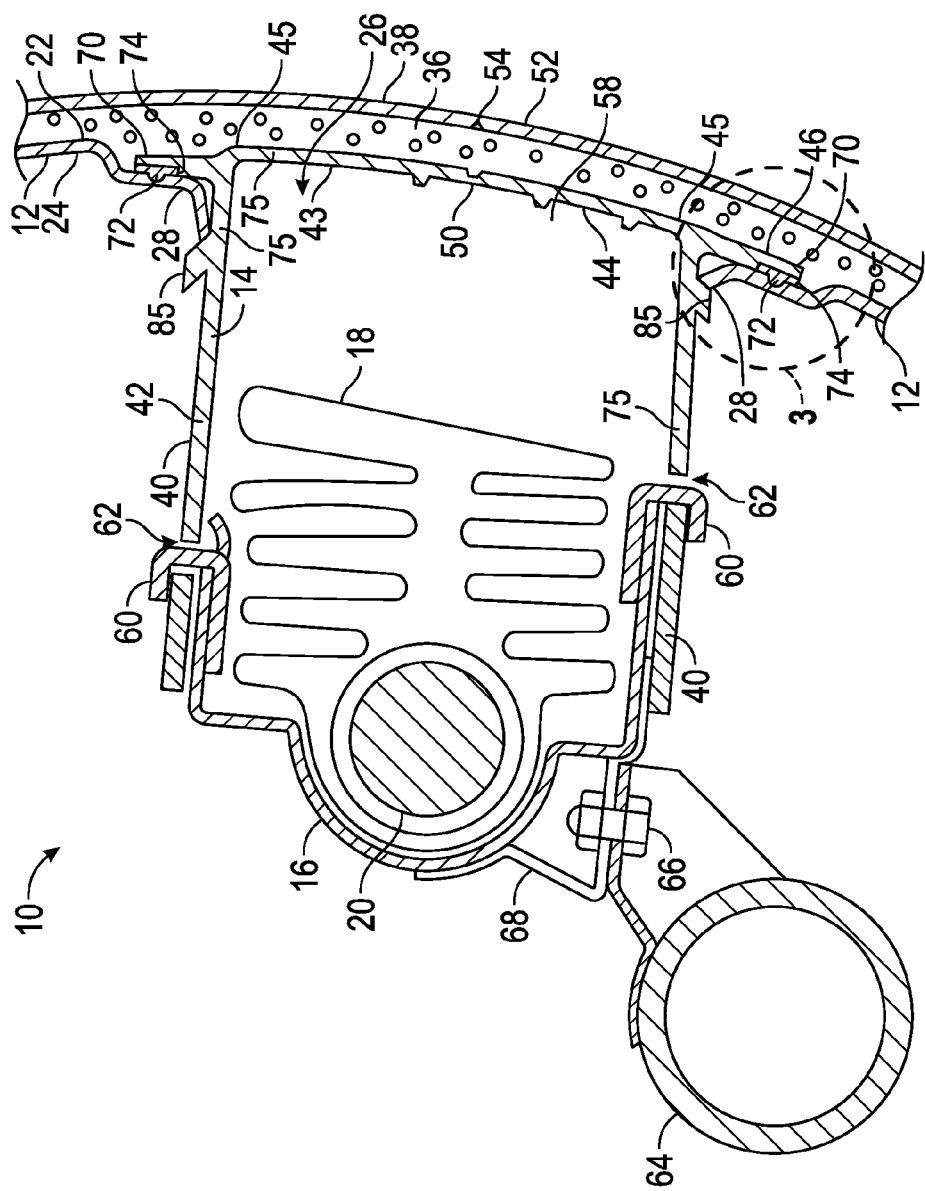
FIG. 1 is a vertical sectional view of a FIP interior panel for a motor vehicle including a substrate and a multi-shot injection molded airbag chute-door assembly in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to FIP interior panels having integrated airbag doors for motor vehicles, and methods for making such interior panels. The exemplary embodiments taught herein provide an interior panel for a motor vehicle comprising a substrate and a multi-shot injection molded airbag chute-door assembly. The substrate has an outer surface, an inner surface, and an opening extending through the substrate.

During an early fabrication stage, in accordance with an exemplary embodiment, the multi-shot injection molded airbag chute-door assembly is mounted to the substrate and at least partially covers the opening. In an exemplary embodiment, the multi-shot injection molded airbag chute-door assembly comprises a chute wall that extends through the opening and at least partially surrounds an interior space that is adjacent to the opening and the inner surface of the substrate. The chute wall is configured to receive an airbag module that contains an airbag and to direct passage of the airbag through the interior space towards the opening during deployment of the airbag. The multi-shot injection molded airbag chute-door assembly further includes a door flap portion that pivotally connects to the chute wall and at least partially covers the opening. A perimeter flange extends from the chute wall away from the interior space. The perimeter flange has a flange section that overlies the outer surface of the substrate. Extending from the flange section is a molded-in lip feature that contacts the outer surface to form a seal between the flange section and the substrate. The term "molded-in lip feature" as used herein refers to a lip feature or other cantilevered-type feature that is integrally formed with the multi-shot injection molded airbag chute-door assembly during a multi-shot injection molding process to form a single structure. In an exemplary embodiment, the molded-in lip feature is made from a relatively more compliant polymeric material than the chute wall, the door flap portion, and the perimeter flange to advantageously form a robust and effective seal that, for example, substantially or completely surrounds the opening.

At a later fabrication stage, in accordance with an exemplary embodiment, the substrate mounted with the multi-shot injection molded airbag chute-door assembly is positioned relative to a skin covering, e.g., in a reaction injection molding (RIM) foaming tool, such that the skin covering extends over the outer surface of the substrate. The fabrication process continues by dispensing a liquid foam forming material (e.g., liquid reactants used to form polyurethane foam, polyurea foam, or the like as are well known in the art) between the skin covering and the substrate and allowing the liquid foam forming material to react and/or solidify to form a foam. In particular, the seal between the flange section and the substrate acts as a flow stop or shut off to prevent or obstruct the flow of the liquid foam forming material past the molded-in lip feature and into the opening of the substrate which would otherwise result in leakage of the liquid foam forming material into the interior space where the airbag interfaces during its deployment. Moreover, because the molded-in lip feature is integrally formed with the multi-shot injection molded airbag chute-door assembly, the seal is consistently positioned to provide sealing to prevent liquid foam forming material leakage. Additionally, there is no separate piece cost for the molded-in lip feature or any expense of manually applying a separate seal or gasket.

Figure 2:
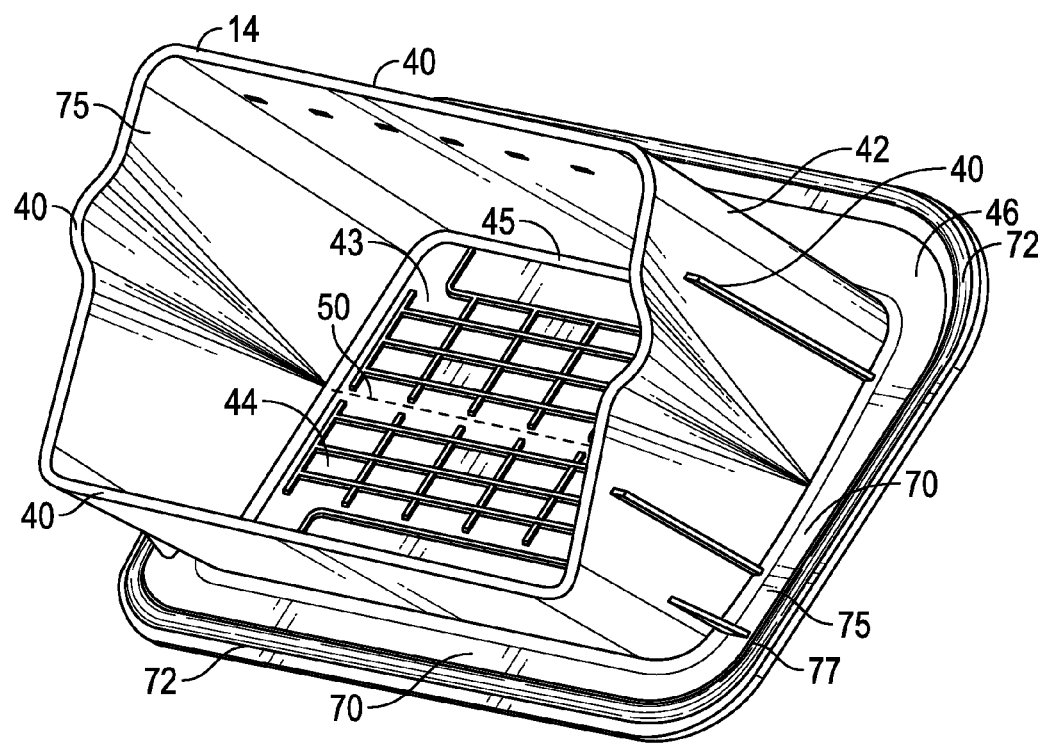
FIG. 2 is a rear-side perspective view of a multi-shot injection molded airbag chute-door assembly in accordance with an exemplary embodiment.

FIG. 1 is a vertical sectional view of an interior panel 10 including a substrate 12 and a multi-shot injection molded airbag chute-door assembly 14 for a motor vehicle in accordance with an exemplary embodiment. FIG. 2 is a rear-side perspective view of the multi-shot injection molded airbag chute-door assembly 14 depicted in FIG. 1. In an exemplary embodiment, the interior panel 10 is an instrument panel that can be positioned forward of a driver seat and a front passenger seat in an interior of the motor vehicle. As such, FIG. 1 depicts a view of the interior panel 10 forward of the front passenger seat. Alternatively, the interior panel 10 can be a door panel or other interior vehicle trim panel. As illustrated, the interior panel 10 comprises the substrate 12, the multi-shot injection molded airbag chute-door assembly 14, and an airbag module 16 that contains a deployable airbag 18 and an inflator 20.

The substrate 12 has an outer surface 22 that faces towards the interior of the motor vehicle, an inner surface 24 that faces away from the interior of the motor vehicle, and an opening 26 that is formed through the substrate 12. As illustrated, the opening 26 is defined by an inner perimeter edge 28 of the substrate 12 and is covered by the multi-shot injection molded airbag chute-door assembly 14, which is mounted to the substrate 12 as will be described in further detail below. The substrate 12 may be formed of a plastic material, such as, for example, styrene maleic anhydride (SMA), polycarbonate (PC), ABS, PC/ABS, polypropylene (PP), or any other substrate material for vehicle interior applications known to those skilled in the art. The outer surface 22 of the substrate 12 and the multi-shot injection molded airbag chute-door assembly 14 are covered by foam 36 and a skin covering 38 to define the interior panel 10 as an FIP interior panel.

The multi-shot injection molded airbag chute-door assembly 14 comprises a chute wall 40 that defines a chute portion 42, door flap portions 43 and 44 that are pivotally connected to the chute portion 42 via hinges 45, and a perimeter flange 46 that surrounds the chute portion 42. In an exemplary embodiment, the multi-shot injection molded airbag chute-door assembly 14 is pre-weakened to define a seam 50 to form an "H-pattern" door arrangement formed using the door flap portions 43 and 44. Alternative door arrangements known to those skilled in the art may also be used, such as, for example, a "U-pattern" door arrangement with only a single door flap portion. The door flap portions 43 and 44, the overlying foam 36, and skin covering 38 together define an integrated airbag door 52 that opens in a parting manner along the seam 50 to permit the airbag 18 to unfold and inflate outside of the interior panel 10. To facilitate the opening of the integrated airbag door 52, the skin covering may be pre-weakened to define a seam 54 that tears during airbag deployment.

The chute wall 40 at least partially surrounds an interior space 58. The interior space 58 is sized to permit passage of the airbag 18 towards the door flap portions 43 and 44 and the integrated airbag door 52 during airbag deployment. Attached to the chute wall 40 is the airbag module 16 that accommodates the airbag 18 in the folded state. As shown, the airbag module 16 has a plurality of hooks 60 that project outwardly through chute wall openings 62 to engage the chute wall 40. The airbag module 16 is attached to a cross member 64 by a bolt and nut 66 via a supporting member 68. As illustrated, the inner perimeter edge 28 of the substrate engages locking tabs 85 on the chute wall 40 for fixedly mounting the multi-shot injection molded airbag chute-door assembly 14 to the substrate 12.

The perimeter flange 46 extends from the chute wall 40 away from the interior space 58 and has a flange section 70. Extending from the flange section 70 is a molded-in lip feature 72. The flange section 70 overlies the outer surface 22 of the substrate 12 and the molded-in lip feature 72 pressingly contacts the outer surface 22 to form a seal 74 between the flange section 70 and the substrate 12. In an exemplary embodiment, both the flange section 70 and the molded-in lip feature 72 surround the chute portion 42, which is disposed through the opening 26. As such, the molded-in lip feature 72 surrounds the opening 26 and forms the seal 74 completely around the opening 26. During an early fabrication stage for forming the foam 36, this arrangement advantageously allows the seal 74 to prevent leakage of a liquid foam forming material into the interior space 58.

In an exemplary embodiment, the multi-shot injection molded airbag chute-door assembly 14 is formed of different polymeric materials (e.g., two different polymeric materials) using a multi-shot injection molding process, such as a two-shot injection molding process or the like as is well known in the art. In one example, the chute wall 40, the door flap portions 43 and 44, and the perimeter flange 46 are formed of a polymeric material 75 and the molded-in lip feature 72 is formed of a polymeric material 77 that is relatively more compliant than the polymeric material 75. In an exemplary embodiment, the polymeric materials 75 and 77 are different thermoplastic elastomeric/elastomer (TPE) materials. TPE materials in general are elastomeric, and have a relatively high elongation over a wide range of temperatures (e.g., from about −30° C. to about 115° C.) and ductility at cold temperatures (e.g., about −30° C.). A TPE material can be a thermoplastic material that comprises a styrenic component, an olefinic component, a urethane component, a copolyester component, or combinations thereof. Alternatively, a TPE material can be a thermoplastic vulcanizate (TPV). In an exemplary embodiment, the polymeric material 75 has a flexural modulus at 23° C. of from about 1,000 to about 10,000 MPa and the polymeric material 77 has a flexural modulus at 23° C. of about 1,000 MPa or less, such as from about 1 to about 1000 MPa. In an exemplary embodiment, the polymeric material 77 is relatively soft and compressible, having for example a Shore A durometer of from about 30 to about 65. Advantageously, the relatively stiffer polymeric material 75 helps the multi-shot injection molded airbag chute-door assembly 14 to absorb energy and control movement of the integrated airbag door 52 during airbag deployment and the relatively more compliant or softer polymeric material 77 helps the molded-in lip feature 72 to pressingly interface with the outer surface 22 of the substrate 12 to effectively form the seal 74.

Referring to FIGS. 1 and 3a, in an exemplary embodiment, the molded-in lip feature 72 in a nominal position 88 (e.g., design position or "as molded" position) as illustrated in FIG. 3a interferes with the outer surface 22 of the substrate 12. As such, the molded-in lip feature 72 flexes, bends, and/or compresses to an installed position 90 when the multi-shot injection molded airbag chute-door assembly 14 is mounted to the substrate 12 and conforms to the outer surface 22 to form the seal 74. In one embodiment, the molded-in lip feature 72 extends from the flange section 70 in a direction away from the opening 26. This advantageously allows the molded-in lip feature 72 to be a relatively stiff in one direction to resist the flow of a liquid foam forming material while being relatively compliant in another direction to compress and/or bend against the outer surface 22 to form the seal 74. In one example, the molded-in lip feature 72 extends from the flange section 70 at an angle (indicated by double headed arrow 92) of from about 20 to about 45 degrees to advantageously facilitate molding the molded-in lip feature 72 in a multi-shot injection molding process with less complicated tooling. In an exemplary embodiment, the molded-in lip feature 72 has a thickness (indicated by double headed arrow 94) of from about 0.5 to about 2.5 mm and a length (indicated by double headed arrow 96) of from about 2 to about 6 mm. By defining the molded-in lip feature 72 with the thickness and length as such, this advantageously allows the molded-in lip feature 72 to be relatively flexible to compress and/or bend against the outer surface 22 of the substrate 12 to form the seal 74. In yet another exemplary embodiment, the molded-in lip feature 72 is laterally offset from the inner perimeter edge 28 a distance (indicated by double headed arrow 98) of from about 0.5 to about 5 mm. By positioning the molded-in lip feature 72 relatively close to the inner perimeter edge 28, sealing around the opening 26 is easier to maintain during the foam fabrication stage(s).

As illustrated in FIG. 3a, in an exemplary embodiment, the flange section 70 has a stepped distal edge portion 100. The stepped distal edge portion 100 includes a back side distal step edge 102 that is adjacent to the outer surface 22 of the substrate 12 and a front side cover distal edge section 104 that extends outwardly past the back side distal step edge 102 and is adjacent to the foam 36 and spaced apart from the outer surface 22 of the substrate 12. The molded-in lip feature 72 extends outwardly from the back side distal step edge 102 and is covered by the front side cover distal edge section 104. Advantageously this allows the front side 106 of the multi-shot injection molded airbag chute-door assembly 14 to be treated, for example by flame, corona, plasma, or the like to improve adhesion to the foam 36 without directly exposing the molded-in lip feature 72 to the treatment which otherwise could detrimentally affect the properties of the molded-in lip feature 72. In an exemplary embodiment, the front side cover distal edge section 104 extends beyond the back side distal step edge 102 a distance (indicated by double headed arrow 107) of from about 5 to about 10 mm and has a thickness of from about 1 to about 2.5 mm.

In an exemplary embodiment, the molded-in lip feature 72 has a lip portion 108 and a bulb portion 110 that extends from the lip portion 108 towards the outer surface 22 of the substrate 12 when in the installed position 90. In an exemplary embodiment, an inner perimeter edge portion 112 of the substrate 12 defines a channel 114 that substantially surrounds the opening 26. As illustrated, the bulb portion 110 is disposed in the channel 114 to advantageously enhance the sealing. In an exemplary embodiment, the channel 114 is a "V-shaped" channel, which advantageously provides two flat surfaces for the bulb portion 110 to contact to further enhance sealing.

Referring to FIG. 3B, in an alternative embodiment, the flange section 70 has a relatively constant thickness (e.g., without being stepped) at the distal edge 116 and the molded-in lip feature 72 extends outwardly from the distal edge 116 and is directly exposed to the foam 36. Advantageously, the foam 36 can press directly against the molded-in lip feature 72 to help compress the bulb portion 110 directly against the channel 114 to enhance sealing.

Figure 4:
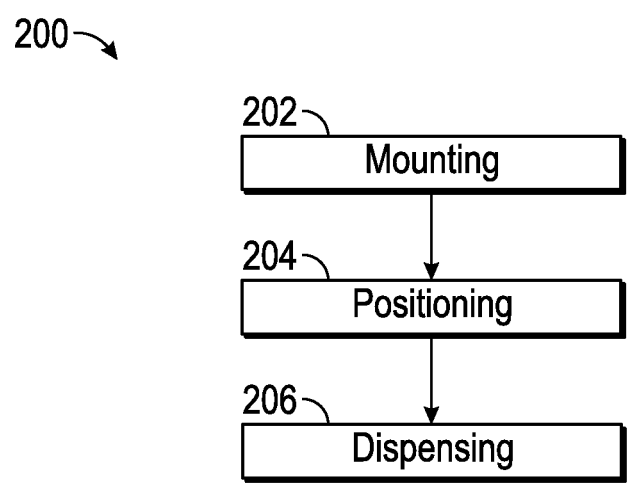
FIG. 4 is a flowchart of a method of making a FIP interior panel having an integrated airbag door for a motor vehicle in accordance with an exemplary embodiment.

Referring to FIG. 4, a flowchart of a method of making an interior panel having an integrated airbag door for a motor vehicle in accordance with an exemplary embodiment is provided. The method 200 comprises mounting (step 202) a multi-shot injection molded airbag chute-door assembly to a substrate such that the multi-shot injection molded airbag chute-door assembly at least partially covers an opening in the substrate. A molded-in lip feature extends from a flange section of a perimeter flange of the multi-shot injection molded airbag chute-door assembly to contact an outer surface of the substrate, forming a seal between the multi-shot injection molded airbag chute-door assembly and the substrate. A skin covering is positioned (step 204) extending over the outer surface of the substrate. A foam forming material is dispensed (step 206) between the skin covering and the substrate and the foam forming material is allowed to form a foam.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag door for a motor vehicle, the interior panel comprising:
    a substrate having an outer surface, an inner surface, and an opening extending therethrough;
    a multi-shot injection molded airbag chute-door assembly mounted to the substrate, wherein the multi-shot injection molded airbag chute-door assembly comprising:
        a chute wall at least partially surrounding an interior space and configured to direct passage of an airbag through the interior space towards the opening during deployment of the airbag;
        a door flap portion pivotally connected to the chute wall and at least partially covering the opening;
        a perimeter flange extending from the chute wall away from the interior space, the perimeter flange having a flange section overlying the outer surface of the substrate, wherein the chute wall, the door flap portion and the perimeter flange comprise a first polymeric material; and
        a molded-in lip feature that extends from the flange section and contacts the outer surface to form a seal between the flange section and the substrate, wherein the molded-in lip feature comprises a second polymeric material, and wherein the flange section has a stepped distal edge portion including a back side distal step edge that is adjacent to the outer surface of the substrate and a front side cover distal edge section that extends outwardly past the back side distal step edge and that is adjacent to the foam and spaced apart from the outer surface of the substrate, and wherein the molded-in lip feature extends outwardly from the back side distal step edge;
    a skin covering extending over the substrate; and
    a foam disposed between the skin covering and the substrate.

2. The interior panel of claim 1, wherein the molded-in lip feature is laterally adjacent to and surrounds the opening to form the seal.

3. The interior panel of claim 1, wherein the molded-in lip feature extends from the flange section in a direction away from the opening.

4. The interior panel of claim 1, wherein the molded-in lip feature in a nominal position extends from the flange section at an angle of from about 20 to about 45 degrees.

5. The interior panel of claim 1, wherein the molded-in lip feature has a thickness of from about 0.5 to about 2.5 mm.

6. The interior panel of claim 1, wherein the molded-in lip feature extends from the flange section a distance of from about 2 to about 6 mm.

7. The interior panel of claim 1, wherein an inner perimeter edge of the substrate defines the opening and the molded-in lip feature is laterally offset from the inner perimeter edge a distance of from about 0.5 to about 5 mm.

8. The interior panel of claim 1, wherein the flange section has a distal edge and the molded-in lip feature extends outwardly from the distal edge of the flange section exposed to the foam.

9. The interior panel of claim 1, wherein the molded-in lip feature is covered by the front side cover distal edge section.

10. An interior panel having an integrated airbag door for a motor vehicle, the interior panel comprising:
    a substrate having an outer surface, an inner surface, and an opening extending therethrough;
    a multi-shot injection molded airbag chute-door assembly mounted to the substrate, wherein the multi-shot injection molded airbag chute-door assembly comprising:
        a chute wall at least partially surrounding an interior space and configured to direct passage of an airbag through the interior space towards the opening during deployment of the airbag;
        a door flap portion pivotally connected to the chute wall and at least partially covering the opening;
        a perimeter flange extending from the chute wall away from the interior space, the perimeter flange having a flange section overlying the outer surface of the substrate, wherein the chute wall, the door flap and the perimeter flange comprise a first polymeric material; and
        a molded-in lip feature that extends from the flange section and contacts the outer surface to form a seal between the flange section and the substrate, wherein the molded-in lip feature comprises a second polymeric material, wherein the molded-in lip feature has a lip portion and a bulb portion that extends from the lip portion towards the outer surface of the substrate, wherein the substrate has an inner perimeter edge portion that defines the opening and that defines a channel that substantially surrounds the opening, and wherein the bulb portion is disposed in the channel;
    a skin covering extending over the substrate; and
    a foam disposed between the skin covering and the substrate.

11. The interior panel of claim 10, wherein the channel is a "V-shaped" channel.

12. The interior panel of claim 1, wherein the second polymeric material is relatively more compliant than the first polymeric material.

13. The interior panel of claim 1, wherein the second polymeric material has a Shore A durometer of from about 30 to about 65.

14. A method of making an interior panel having an integrated airbag door for a motor vehicle, the method comprising the steps of:

mounting a multi-shot injection molded airbag chute-door assembly to a substrate such that the multi-shot injection molded airbag chute-door assembly at least partially covers an opening in the substrate and that a molded-in lip feature extends from a flange section of a perimeter flange of the multi-shot injection molded airbag chute-door assembly to contact an outer surface of the substrate forming a seal between the multi-shot injection molded airbag chute-door assembly and the substrate, and wherein the perimeter flange comprises a first polymeric material and the molded-in lip feature comprises a second polymeric material;

positioning a skin covering extending over the outer surface of the substrate; and dispensing a liquid foam forming material between the skin covering and the substrate and allowing the liquid foam forming material to form a foam, wherein the flange section has a stepped distal edge portion including a back side distal step edge that is adjacent to the outer surface of the substrate and a front side cover distal edge section that extends outwardly past the back side distal step edge and that is adjacent to the foam and spaced apart from the outer surface of the substrate, and wherein the molded-in lip feature extends outwardly from the back side distal step edge.

* * * * *